(12) United States Patent
Rosson

(10) Patent No.: US 10,928,595 B2
(45) Date of Patent: *Feb. 23, 2021

(54) OPTICAL CONNECTOR ELEMENT

(71) Applicant: Joel C. Rosson, Hickory, NC (US)

(72) Inventor: Joel C. Rosson, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,113

(22) Filed: Dec. 2, 2019

(65) Prior Publication Data

US 2020/0103601 A1    Apr. 2, 2020

Related U.S. Application Data

(63) Continuation of application No. 14/483,206, filed on Sep. 11, 2014, now Pat. No. 10,495,824.

(60) Provisional application No. 61/994,410, filed on May 16, 2014.

(51) Int. Cl.
  *G02B 6/36* (2006.01)
  *G02B 6/38* (2006.01)

(52) U.S. Cl.
  CPC ......... *G02B 6/3869* (2013.01); *G02B 6/3826* (2013.01); *G02B 6/3821* (2013.01); *G02B 6/3861* (2013.01)

(58) Field of Classification Search
  CPC ........................................................ G02B 7/00
  USPC ...................................................... 385/78, 80
  See application file for complete search history.

(56) References Cited

U.S. PATENT DOCUMENTS

| 5,096,276 | A  | 3/1992  | Gerace et al. |
| 5,238,428 | A  | 8/1993  | Brakenridge et al. |
| 5,281,170 | A  | 1/1994  | Murphy |
| 6,173,097 | B1 | 1/2001  | Throckmorton et al. |
| 6,318,905 | B1 | 11/2001 | Valencia et al. |
| 7,201,518 | B2 | 4/2007  | Holmquist |
| 8,132,969 | B2 | 3/2012  | Liu et al. |
| 8,221,007 | B2 | 7/2012  | Peterhans et al. |
| 2001/0028772 | A1 | 10/2001 | Shirai et al. |
| 2007/0104425 | A1 | 5/2007  | Larson et al. |
| 2009/0097799 | A1 | 4/2009  | Sakurai et al. |

OTHER PUBLICATIONS

FOCIS 10A Fiber Optic Connector Intermateability Standard Type LC TIA/EIA-604-10A.

*Primary Examiner* — Eric Wong
(74) *Attorney, Agent, or Firm* — Michael L. Leetzow, P.A.

(57) ABSTRACT

An optical connector has a single ferrule held within a ferrule holder to make a ferrule assembly. The ferrule assembly is inserted into a connector housing with an expansion slot extending from the front end toward the back end to allow insertion of the ferrule assembly from the front of the connector housing. The ferrule holder has at least one extension extending from a outer surface thereof and a window in communication with and opening extending through the ferrule holder. The connector housing also has a window disposed in the main body, the window disposed in the main body in an outer surface adjacent the expansion slot to receive the extension from the ferrule holder.

18 Claims, 9 Drawing Sheets

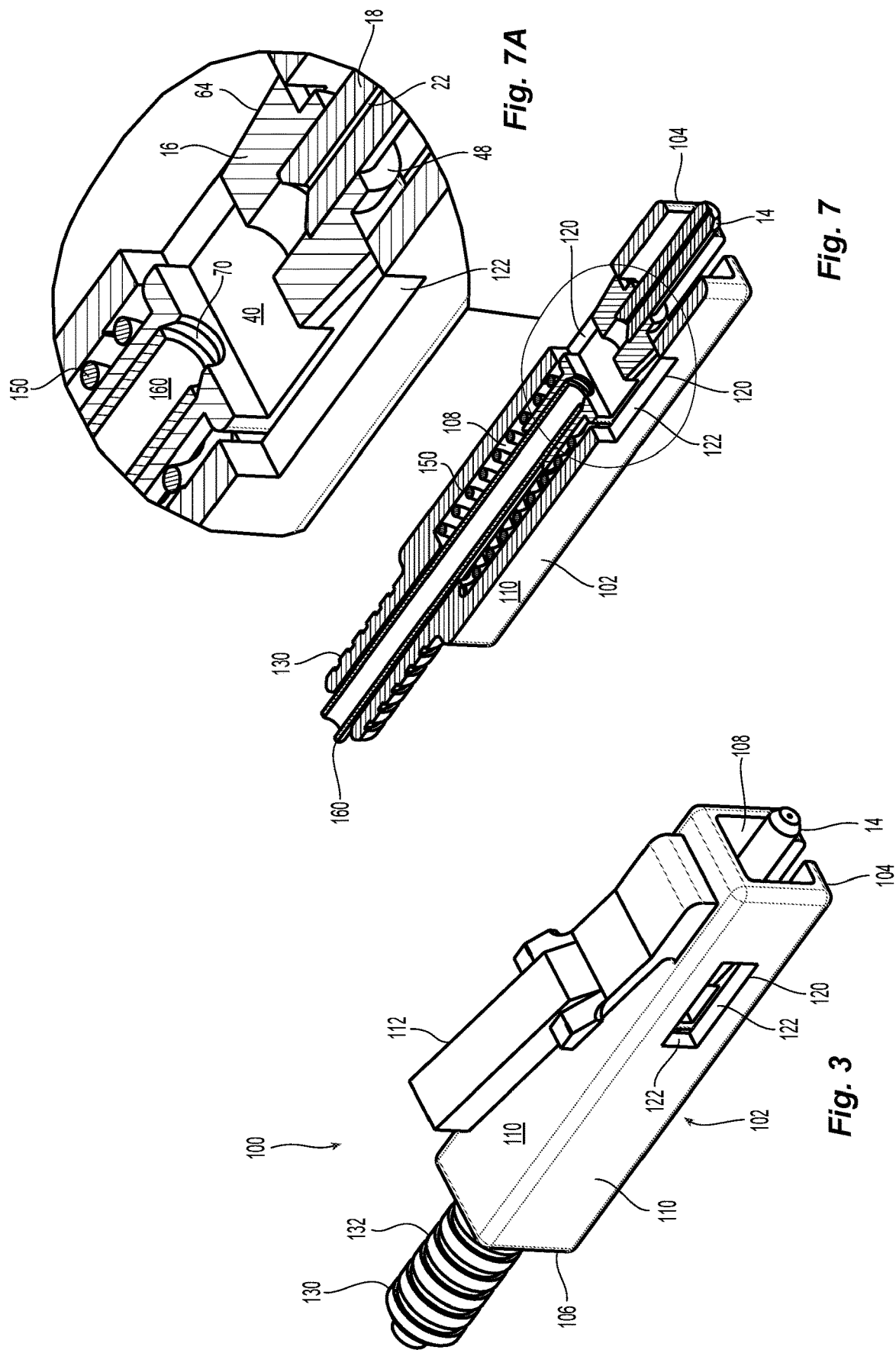

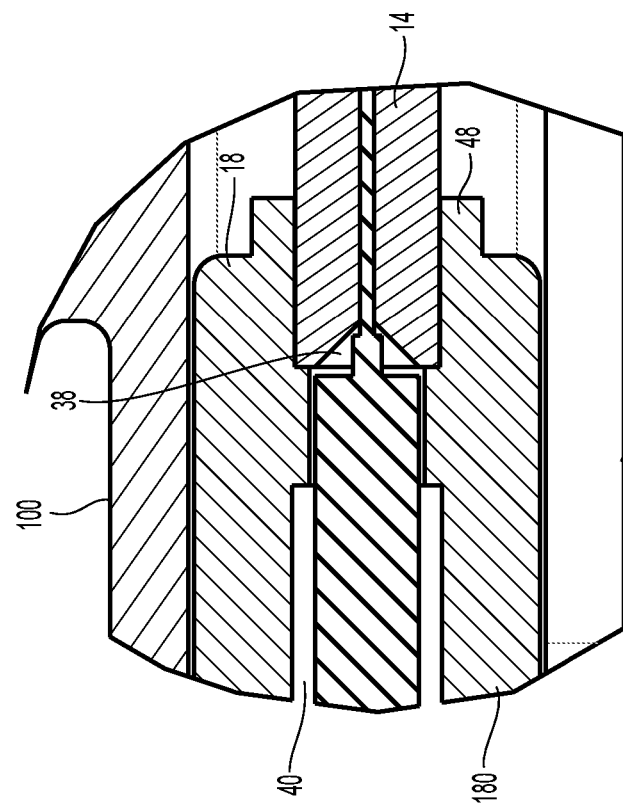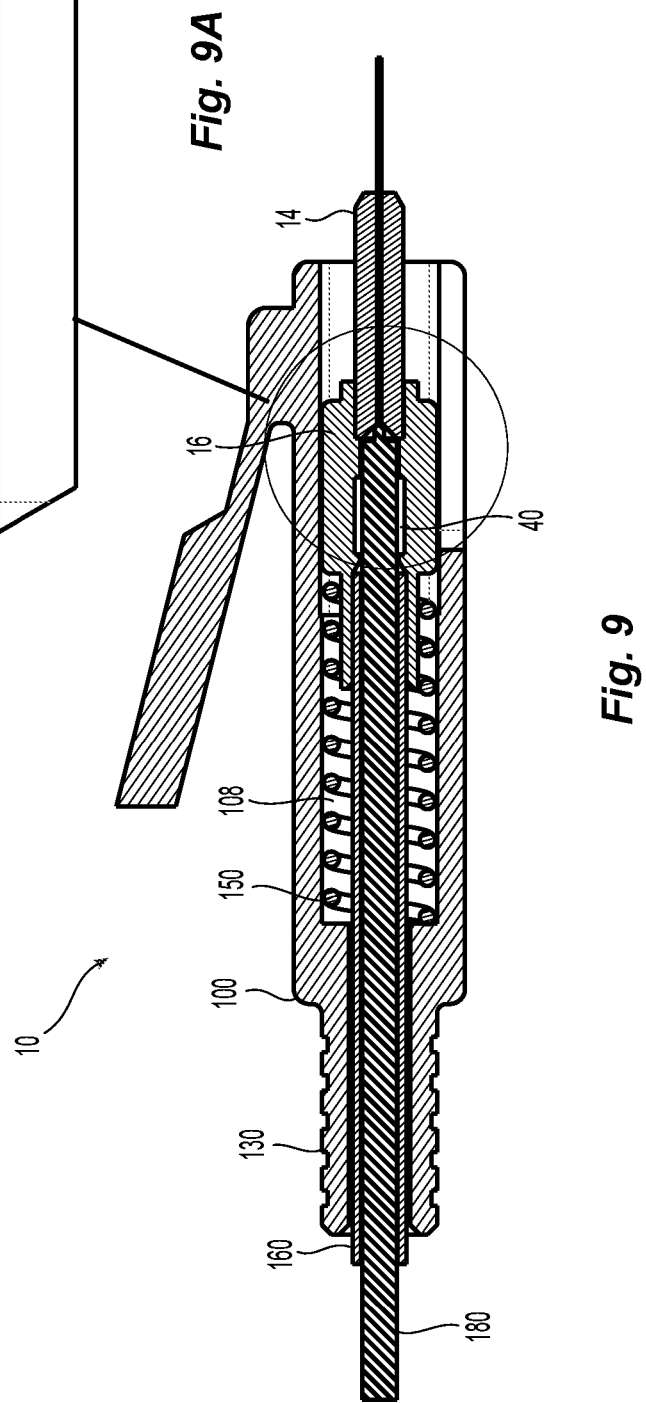

OPTICAL CONNECTOR ELEMENT

REFERENCE TO RELATED CASE

This application claims priority under 35 U.S.C. § 119 (e) to provisional application No. 61/994,410 filed on May 16, 2014, and under 35 U.S.C. § 120 to application Ser. No. 14/483,206 filed on Sep. 11, 2014 the contents of which are hereby incorporated by reference in their entirety.

BACKGROUND OF THE INVENTION

Field of the Invention

Typically, assembling an optical connector element requires assembling many elements of the optical connector element in a particular order and may require special tools. The connector housing is usually a two-piece housing, with the ferrule assembly and spring inserted from the back end and then the pieces of the connector housing have to be secured together. Similarly, the epoxy used to secure the optical fiber in the ferrule assembly is inserted from the back end, but it is difficult if not impossible to see where and how much of the epoxy is disposed in the ferrule assembly. The epoxy also then wicks back along a lead-in tube that is used to assist in inserting an optical fiber into the connector and the optical ferrule in particular.

Thus, an optical connector element has been designed to allow for a unitary connector housing wherein the ferrule assembly can be inserted from the front of the connector housing and the ferrule assembly and connector housing have windows therein to allow visual inspection and to prevent the wicking of the epoxy to the lead-in tube.

SUMMARY OF THE INVENTION

The present invention is directed to a ferrule assembly that includes single ferrule having a front end, a back end and a fiber opening for receiving a portion of an optical fiber therein extending between the front end and the back end, and a ferrule holder having a front end, a back end, and a middle portion disposed between the front end and the back end, an opening extending from the front end to the back end, the opening configured to receive the back end of the single ferrule therein at the front end thereof, the middle portion having at least one extension extending from a outer surface thereof, the middle portion also having a window, the window in communication with the opening extending between the front end and the back end of the ferrule holder.

According to another aspect of the present invention, an optical connector is disclosed that includes a single ferrule having a front end, a back end and an fiber opening for receiving a portion of an optical fiber therein extending between the front end and the back end, a ferrule holder having a front end, a back end, and a middle portion disposed between the front end and the back end, an opening extending from the front end to the back end, the opening configured to receive the back end of the ferrule therein at the front end thereof, the middle portion having at least one extension extending from a outer surface thereof, the middle portion also having a window, the window in communication with the opening extending between the front end and the back end of the ferrule holder, and a connector housing further comprising a main body having a front end, a back end, and an opening in the main body extending between the front end and the back end, the main body having four outer surfaces and being generally square in cross section, an expansion slot extending from the front end toward the back end, the expansion slot passing through the main body from one of the four outer surfaces and into the opening, and at least one window disposed in the main body and extending from an outer surface into the opening, the window disposed in the main body in an outer surface adjacent the expansion slot.

In yet another aspect, a method of assembling an optical connector provides for the steps of inserting a syringe with epoxy into an opening in a ferrule holder, the ferrule holder having a front end, a back end, and a middle portion disposed between the front end and the back end, the opening extending from the front end to the back end, the opening configured to receive a back end of a single ferrule therein at the front end thereof, the middle portion having a window, the window in communication with the opening extending between the front end and the back end of the ferrule holder, the syringe being inserted from the back end of the ferrule holder through a first lead-in tube inserted into the opening of the ferrule holder from the back end to place the epoxy at the back end of the single ferrule, removing the syringe from the ferrule holder and the first lead-in tube, removing the first lead-in tube from the ferrule holder, inserting a second lead-in tube from the ferrule holder, the second lead-in tube having a lumen that is smaller than that of the first lead-in tube, inserting an optical fiber into the second lead-in tube and the single ferrule, and curing the epoxy to secure the optical fiber in the ferrule holder and the single ferrule.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 3 is a perspective view of the optical connector of FIG. 1;

FIG. 7 is a cross section view of the optical connector of FIG. 3;

FIG. 7A is an enlarged view of a portion of the optical connector of FIG. 7;

FIG. 9 is a cross section view of the optical connector of FIG. 8 with an optical fiber inserted therein;

FIG. 9A is an enlarged view of a portion of the optical connector of FIG. 9;

DETAILED DESCRIPTION OF THE PREFERRED EMBODIMENTS

Figure 1:
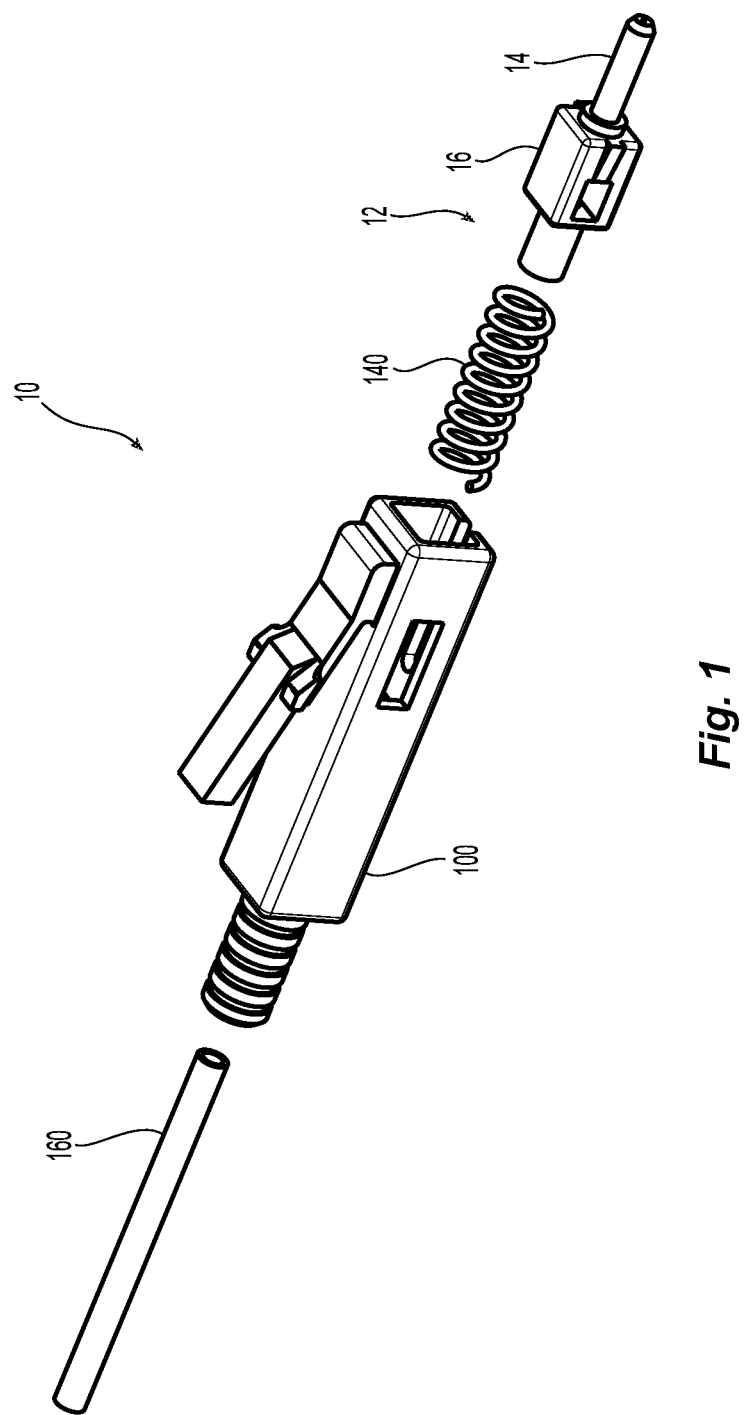
FIG. 1 is a exploded view of one embodiment of an optical connector according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

FIG. 1 illustrates an exploded, perspective view of one embodiment of an optical connector 10 according to the present invention. The connector assembly 10 has a ferrule assembly 12, which includes a single ferrule 14 and a ferrule holder 16. The single ferrule 14 has a front end 18, a back end 20 and an fiber opening 22 for receiving a portion of an optical fiber (see FIGS. 2A and 8). As is known in the art, the optical fiber is inserted from the rear and is generally terminated near the front end 18 and may be polished with the single ferrule 14. Preferably, the single ferrule 14 is made from zirconia ceramic, although any appropriate material could be used. The single ferrule 14 is typically 1.25 mm in diameter and 6.4 mm in length, as is known in the art. The single ferrule may also have other dimensions as required by the application for the connector assembly 10. However, the single ferrule is designed to be used with a single optical fiber. As better illustrated in FIGS. 2a and 2b, the single ferrule 14 may also have a chamfer 24 on the front end 18.

The ferrule holder 16 has a front end 30, a back end 32, and a middle portion 34 disposed between the front end 30 and the back end 32. The ferrule holder 16 also has an opening 36 extending from the front end 30 and the back end 32. The opening 36 has three portions, a front portion 38, a middle portion 40, and back portion 42. The front portion 38 of the opening 36 is configured to receive the back end 20 of the single ferrule 14. The front portion 38 of the opening 36 may further be configured with a shoulder 44 against which the back end 20 of the single ferrule 14 is disposed.

The ferrule holder 16 can be made in a variety of ways and from various materials. For example, the ferrule holder 16 can be made by over-molding or alternately described as insert-molding the single ferrule 14 to produce the ferrule holder 16 and the ferrule assembly 12. The single ferrule 14 could be retained by the over-molded plastic in one of two ways. The single ferrule 14 may be retained with a scuffed surface finish or notch in the outer diameter of the single ferrule 14 that fills with plastic during the over-molding process. This provides a better retention method for the single ferrule 14 than a smooth outer diameter and with plastic formed thereto. The plastic could be a thermoplastic or a thermoset type material with thermoplastic being preferred, an example being LCP.

The ferrule holder 16 could alternately be machined from a metal alloy such as NM6, which is a common material for fiber optic components. In this case, the single ferrule 14 could be press-fit into the ferrule holder 16 to engage the shoulder 44 or bonded with an adhesive.

As another alternative, the ferrule holder 16 could be molded from a plastic material and the single ferrule 14 could be inserted into the opening 36 (and portion 38 in particular) and then bonded into the ferrule holder 16 with an epoxy or other adhesive.

Figure 2B:
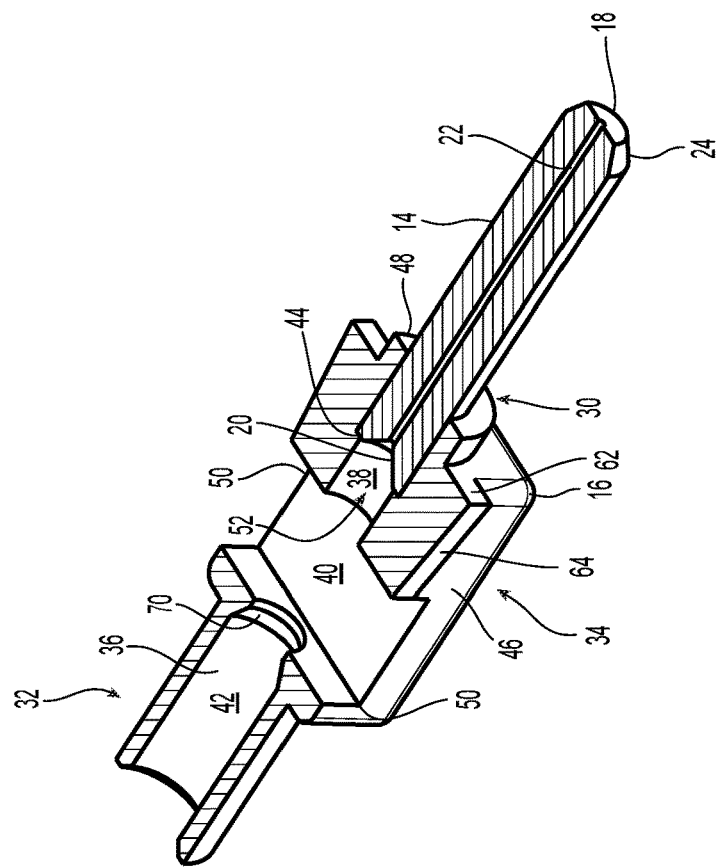
FIG. 2B is a cross section view of the ferrule assembly of FIG. 2A.
Figure 2A:
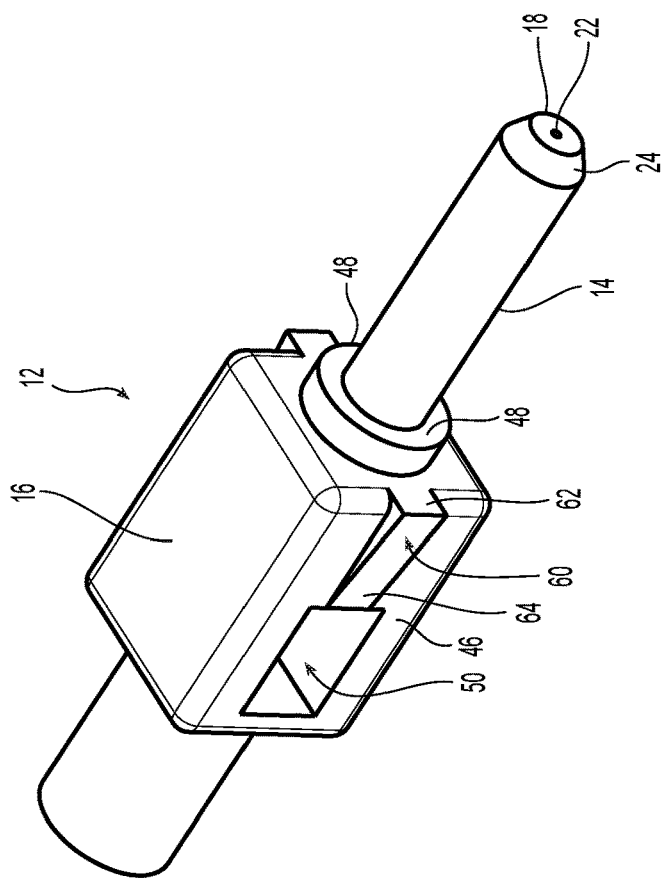
FIG. 2A is a perspective view of a ferrule assembly that is a part of the optical connector of FIG. 1.

The middle portion 34 is generally rectangular in shape, the middle portion 34 having a generally square cross section across the opening 36, with four outer surfaces 46 defining the outside of middle portion 34. The ferrule holder 16 may also have a raised ring 48 around the opening 36 at the front of the middle portion 34 to receive the single ferrule 14. The opening 36, and in particular middle portion 40 of opening 36, is different in the middle portion 34 due to the windows 50 and an expanded opening 36 therein. As illustrated in FIG. 2b the front portion 38 of the opening 36 is generally the same size, except for the shoulder 44. Thus, there is an epoxy well 52 that is disposed between the back end 20 of the single ferrule 14 and the middle portion 40 of the opening 26.

The middle portion 34 preferably has two windows 50, one on either side of the ferrule holder 16, although there may be only one window 50. The windows 50 are in communication with the opening 36 and, together with the middle portion 40 of opening 36, provide a break for the epoxy within the opening 36 to prevent the epoxy from wicking back towards the back portion 42, as disclosed in more detail below.

Extending outward from two of outer surfaces 46 is at least one extension 60. As illustrated in the figures, there are preferably two extensions 60, one on either side of the ferrule holder 16. The extensions 60 are tapered, with the extension having the greatest lateral dimension at a front surface 62, and then the side surfaces 64 tapering inwardly toward the outer surface 46 and the extensions are terminated adjacent the window 50.

The back end 32 of the ferrule holder 16 is preferably cylindrical to receive a lead-in tube into the back portion 42 of the opening 36 and a resilient member around the outside thereof, as discussed in detail below. As illustrated in FIG. 2b, the back portion 42 of the opening 36 has a narrowing 70 at the junction with middle portion 40, which is configured to engage and prevent a lead-in tube from entering into the middle portion 40 of opening 36.

Figure 4:
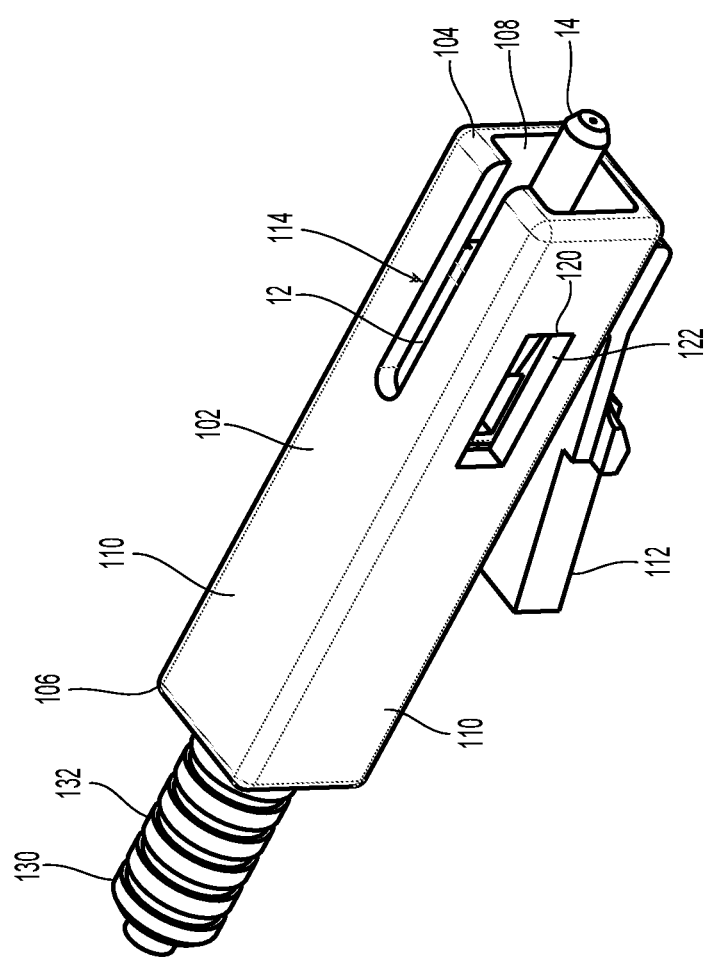
FIG. 4 is a perspective view of the bottom of the optical connector of FIG. 1 and FIG. 3.

The optical connector 10 also has a connector housing 100 illustrated in FIG. 1, and also in FIGS. 3 and 4. The connector housing 100 has a main body 102 having a front end 104, a back end 106, and an opening 108 in the main body 102. The opening 108 extends between the front end 104 and the back end 106 to receive the ferrule assembly 12 and the optical fiber (not illustrated) therein. The main body 102 has four outer surfaces 110 and is generally square in cross section. See FIG. 5. The main body 102 has a latch 112 extending from the top surface 100, which allows it to be inserted into an appropriate adapter (an LC adapter in this case, although the optical connector is not limited to an LC format). The main body 102 of connector housing 100 has an expansion slot 114 extending from the front end 104 toward the back end 106. The expansion slot 114 also extends through the main body 102 from one of the four outer surfaces 110 and into the opening 108. As illustrated in FIG. 4, the ferrule assembly 12 can be seen through the expansion slot 114 in the opening 108. The expansion slot 114 allows for flexing of the main body 102 when the ferrule assembly 12 is inserted into the connector housing 100 through the front end 104. As described in more detail below, the back end 32 of the ferrule holder 16 (with the single ferrule 14 fixed therein) is inserted into the connector housing 100. As the back end 32 of the ferrule holder 16 is inserted into the connector housing 100 through the front end 104, the main body 102 flexes to allow the ferrule holder 16 to be disposed within the main body 102.

The main body 102 also has at least one window 120 disposed in the main body 102 and preferably two windows 120. The windows 120 extend from an outer surface 110 through the main body 102 and into the opening 108. Given that the expansion slot 114 extends rearwardly from the front end 104, the window 120 is preferably disposed in an outer surface 110 of main body 102 adjacent the expansion slot 114 to prevent any overlap of the two structures. The windows 120 are disposed within the main body 102 to coincide with the extensions 60 as described in more detail below. The windows 120 are defined by four surfaces 122 that also extend from an outer surface 100 through the main body 102 and into the opening 108.

The connector housing 100 also has a generally cylindrical portion 130 extending rearwardly from the back end 106 of the main body 102 that acts as a crimp body for the optical connector 10. As illustrated in the figures, the generally cylindrical portion 130 has ribs 132 on the outside thereof for a crimp ring (not shown) to be crimped around the cylindrical portion 130 to secure optical cable jackets in between as is known in the art.

Figure 5:
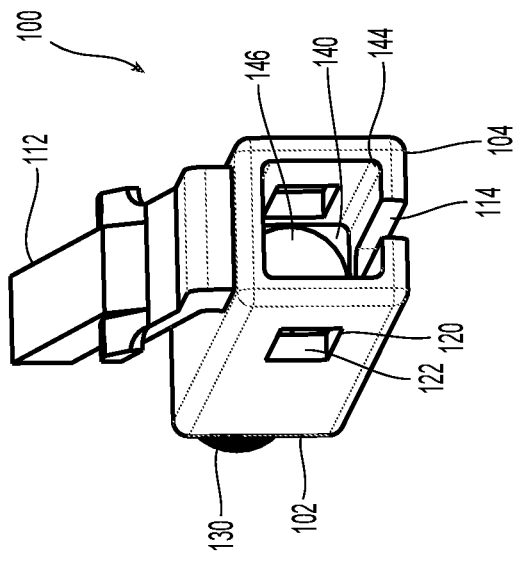
FIG. 5 is a perspective view of the connector housing of the optical connector of FIG. 1.
Figure 6:
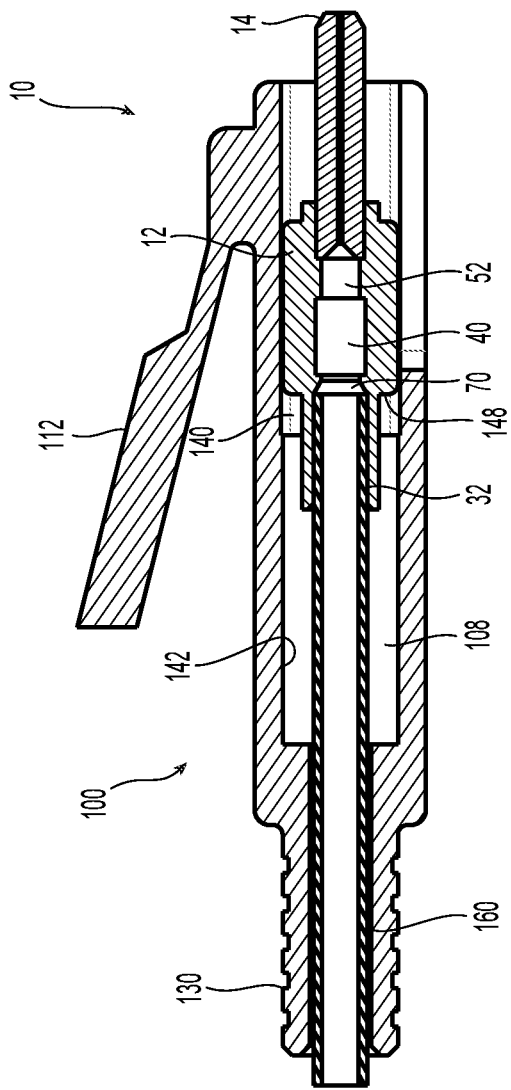
FIG. 6 is a cross section view of the optical connector of FIG. 1 at 90 degrees from FIG. 3*b;*

Turning to FIGS. 5 and 6, the main body 102 has disposed in the opening 108 a ferrule assembly stop 140. The ferrule assembly stop 140 projects from inside walls 142 that define the opening 108 and, in particular, from the corners 144 of the opening 108. As the ferrule holder 16 has a back end 32 of the ferrule holder 16 that is cylindrical, the ferrule assembly stop 140 has a cylindrical opening 146 therein to allow the back end 32 of the ferrule holder 16 to move relative to the cylindrical opening 146. The ferrule assembly stop 140 has a forward facing surface 148 to engage a back surface of the middle portion 34 to prevent the ferrule assembly 12 from being biased too far into the connector housing 100. The extensions 60 of the ferrule holder 16, once inserted into the main body 102, will project into the windows 120. See FIGS. 7 and 7A. The projections 60 will, as a result of their configuration, move within the windows 120 in a front-to-back and back-to-front direction. The front surface 62 of the extensions 60 will engage one of the surfaces 122 to prevent the ferrule assembly 12 from moving too far toward the front end 104 of main body 102. As can be seen in FIGS. 1 and 7, a spring 150 is inserted into the main body 102 before the ferrule assembly 12 to bias the ferrule assembly 12 in a forward position relative to the main body 102. The front portion of the spring 150 is dimensioned so as to fit within the cylindrical opening 146 of the ferrule assembly stop 140 when the ferrule assembly is biased in a forward position, i.e., when the front surface 62 of the extensions 60 engages surfaces 122. The rear part of the spring 150 engages a forward facing surface in the opening 108 to provide the bias.

A lead-in tube 160 is inserted into the connector housing 100 through the generally cylindrical portion 130 extending rearwardly from the back end 106 of the main body 102. The lead-in tube 160 is also disposed in the back end 32 of the ferrule holder 16 and engages the narrowing 70 at the back portion 42 of the opening 36. The lead-in tube 160 assists in centering the optical fiber relative to the fiber opening 22 in the single ferrule 14. The lead-in tube 160 is cylindrical with an outer surface 162 and an inner surface 164 that defines a lumen 166. The size of the lumen 166 may be changed depending on the size of the optical fiber to be inserted into optical connector 10.

Figure 8:
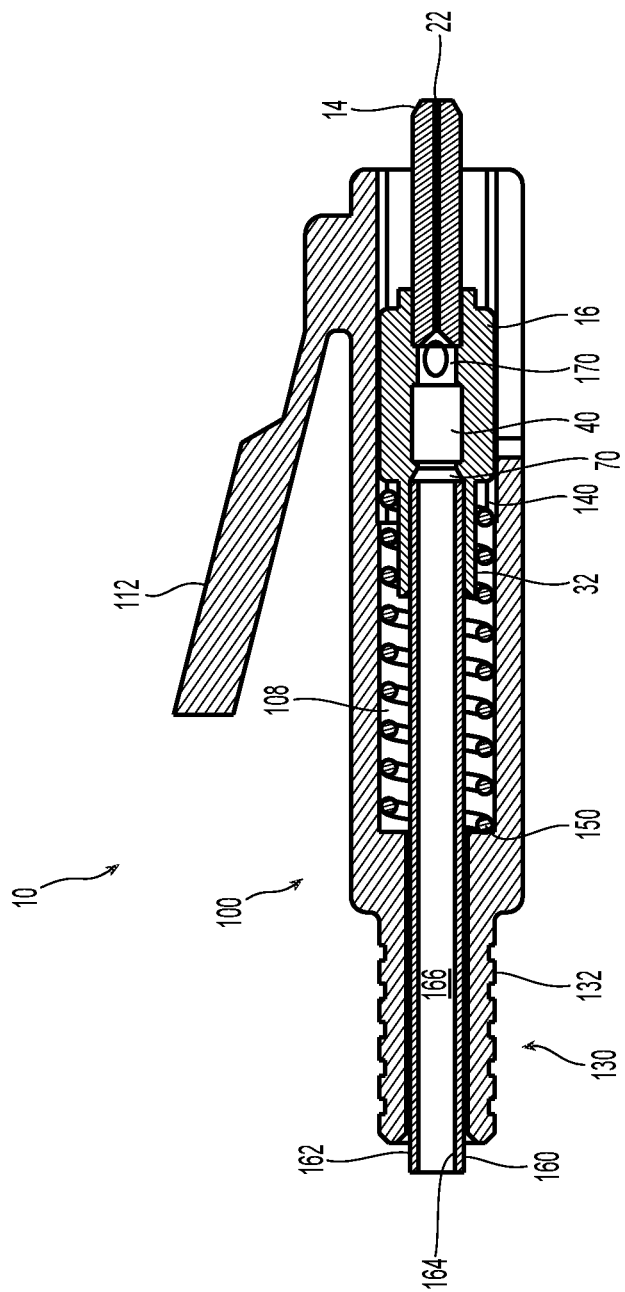
FIG. 8 is a cross section view of the optical connector of FIG. 6 showing epoxy schematically inserted behind the ferrule.

Turning now to FIGS. 8 and 9 for the method of assembling an optical connector 10. As noted above, the single ferrule 14 is connected to the ferrule holder 16 in one of the described manners. The ferrule assembly 12 and spring 150 are inserted into the opening 108 at the front end 104 of the main body 102. A lead-in tube 160 is inserted into the connector housing 100 through the generally cylindrical portion 130 extending rearwardly from the back end 106 of the main body 102. The lead-in tube 160 is inserted until it engages the narrowing 70 of the opening 36. A small amount of epoxy 170 is deposited in back end 20 of the single ferrule 14 (to inject some epoxy in the fiber opening 22) and then more is deposited in the epoxy well 52 between the back end 20 of the single ferrule 14 and the middle portion 40 of the opening 26, typically by a syringe also inserted from the back through the lead-in tube 160. The deposition of the epoxy can be seen and monitored by the user looking through the windows 50 and 120. See FIG. 8. Again referring to FIG. 8, the lead-in tube 160 has a lumen 166 that is sized for a 900 micron coated fiber 180. The outer surface 162 of the lead-in tube 160 closely matches the inside diameter of the connector housing and the back end 32 of the ferrule holder 16. The 900 micron coated fiber 180 is guided to the single ferrule 12 from the generally cylindrical portion 130. See also FIG. 9a. The fiber 180 passes through the epoxy, thereby coating the fiber 170 and causing the epoxy to move into the opening 22. The epoxy is also known to wick backwards along the fiber 180 and rearward into the ferrule holder 16. Once the epoxy that wicks rearwardly gets to the middle portion 40 of opening 36, the wicking of the epoxy stops. In conventional connectors, the wicking of the epoxy may cause the lead-in tube to be epoxied into the optical connector, which is undesirable. It is also possible that the wicking of the epoxy leads to voids in the epoxy around the bare optical fiber, leading to broken optical fibers. In the present invention, the epoxy cannot wick back to contact the lead-in tube 160 due to the presence of the middle portion 40.

Figure 10:
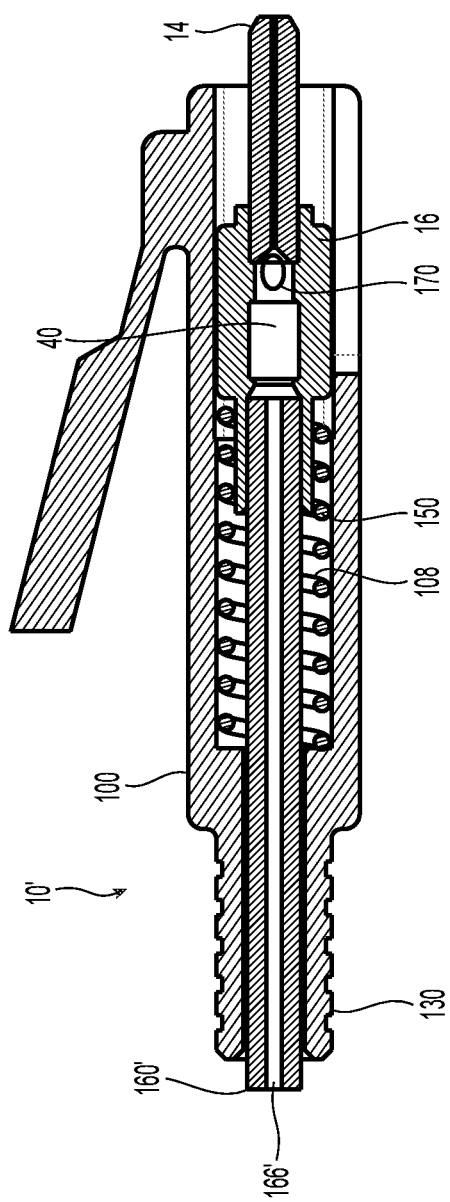
FIG. 10 is a cross section view of the optical connector of FIG. 1 with a lead-in tube having a smaller inner diameter than illustrated in FIG. 9.
Figure 11:
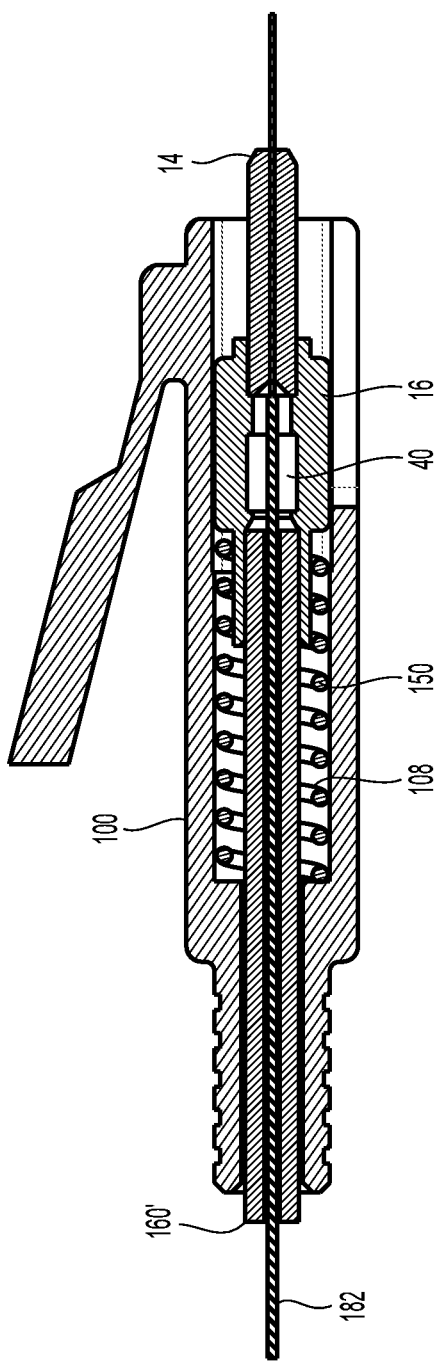
FIG. 11 is cross section view of the optical connector of FIG. 10 with a 250 micron optical fiber inserted therein.

Turning now to FIGS. 10 and 11, the optical connector 10' is being assembled as before. However, a new lead-in tube 160' is being used, with a lumen 166' that is smaller and sized for a 250 micron coated optical fiber 182. Using the lead-in tube 160' with the smaller lumen 166' provides the same advantages and accuracy in inserting the optical fiber 182. The optical connectors 10 and 10' are positioned to allow the epoxy to cure. Typically this is a position where the front end 18 of the single ferrule 14 is pointed downwards to prevent the epoxy from running down the optical fibers.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A ferrule assembly comprising:
a single ferrule having a front end, a back end and a fiber opening for receiving a portion of an optical fiber therein extending between the front end and the back end; and
a ferrule holder having a front end, a back end, and a middle portion disposed between the front end and the back end, an opening extending from the front end to the back end of the ferrule holder, the opening configured to receive the back end of the single ferrule therein at the front end thereof, the middle portion having a window, the window in communication with the opening extending between the front end and the back end of the ferrule holder.

2. The ferrule assembly according to claim 1, wherein the middle portion has a generally square cross section and four outer surfaces.

3. The ferrule assembly according to claim 1, wherein the at least one extension is disposed forward of the window and has a frontward facing surface.

4. The ferrule assembly according to claim 1, wherein the backend of the ferrule holder has a circular outer configuration to engage at least a portion of a spring.

5. The ferrule assembly according to claim 3, wherein the at least one extension is tapered, the extension extending farther outward from the middle portion at frontward facing surface and tapering inward rearwardly therefrom.

6. The ferrule assembly according to claim 1, wherein the window extends across the ferrule holder and through two opposing outer surfaces.

7. The ferrule assembly according to claim 1, the opening in the ferrule holder is configured to receive epoxy between the window and the single ferrule.

8. The ferrule assembly according to claim 1, wherein the at least one extension comprises two extensions and the two extensions are on opposite sides of the ferrule holder.

9. An optical connector comprising:
a single ferrule having a front end, a back end and a fiber opening for receiving a portion of an optical fiber therein, the fiber opening extending between the front end and the back end;
a ferrule holder having a front end, a back end, and a middle portion disposed between the front end and the back end, an opening extending from the front end to the back end of the ferrule holder, the opening configured to receive the back end of the ferrule therein at the front end thereof, the middle portion having a window, the window in communication with the opening extending between the front end and the back end of the ferrule holder; and
a connector housing further comprising a main body having a front end, a back end, and an opening in the main body of the connector housing extending between the front end and the back end, the main body having four outer surfaces, and at least one window disposed in the main body and extending from an outer surface into the opening.

10. The optical connector according to claim 9, wherein the middle portion of the ferrule holder has at least one extension extending from an outer surface thereof.

11. The optical connector according to claim 10, wherein the at least one extension is disposed within the at least one window.

12. The optical connector according to claim 9, wherein the single ferrule and ferrule holder comprise a ferrule assembly, and
further comprising a ferrule assembly stop in the opening of the main body, the ferrule assembly stop disposed between the at least one window and the back end, the ferrule assembly stop extending from at least one interior wall into the opening to engage and prevent the ferrule assembly from moving backward past the ferrule assembly stop.

13. The optical connector according to claim 12, wherein the middle portion of the ferrule holder has at least one extension extending from an outer surface thereof, and the ferrule assembly is movable within the connector housing between a first position and a second position, wherein in the first position the ferrule holder engages the ferrule assembly stop and in the second position a forward facing surface of the at least one extension engages a surface defining the at least one window.

14. The optical connector according to claim 9, further comprising a rearward facing surface disposed in the opening of the ferrule holder and rearward of the window, the rearward facing surface configured to engage a front portion of lead-in tube to prevent the lead-in tube from entering the opening adjacent the window.

15. The optical connector according to claim 9, the connector housing further comprising an expansion slot extending from the front end towards the back end, the expansion slot passing through the main body from one of the four outer surfaces and into the opening.

16. The optical connector according to claim 15, wherein the at least one window is disposed in the main body in an outer surface adjacent the expansion slot.

17. The optical connector according to claim 15, wherein the main body is generally square in cross section.

18. A ferrule assembly comprising:
a single ferrule having a front end, a back end and a fiber opening extending between the front end and the back end; and
a ferrule holder having a front end, a back end, and a middle portion disposed between the front end and the back end, an opening extending from the front end to the back end, the opening configured to receive the back end of the single ferrule therein at the front end thereof, the middle portion having at least one window, the at least one window in communication with the opening extending between the front end and the back end of the ferrule holder.

* * * * *